C. SEAVER, Jr.,

Assignor, by mesne assignments, to S. ZINN & L. MESSER.

Clasp for Clothing.

No. 9,740. Reissued June 7, 1881.

Witnesses
~~Geo~~ Nufeland
William Miller

Inventor
Chandler Seaver. Jr.
by Van Santvoord & Hauff
his att'ys

N. PETERS. Photo-Lithographer, Washington, D. C.

UNITED STATES PATENT OFFICE.

CHANDLER SEAVER, JR., OF WEST NEWTON, MASSACHUSETTS, ASSIGNOR, BY MESNE ASSIGNMENTS, TO SIMON ZINN AND LOUIS MESSER, BOTH OF NEW YORK CITY, N. Y.

CLASP FOR CLOTHING.

SPECIFICATION forming part of Reissued Letters Patent No. 9,740, dated June 7, 1881.

Original No. 47,135, dated April 4, 1865. Application for reissue filed May 6, 1881.

*To all whom it may concern:*

Be it known that I, CHANDLER SEAVER, Jr., a citizen of the United States, residing at West Newton, in the county of Middlesex and State of Massachusetts, have invented certain new and useful Improvements in Clothes-Fasteners, of which the following is a specification.

This invention consists in the combination, in a clasp, of a base-plate, a stud projecting from the base-plate, a top plate connected to the base-plate, a toe projecting from said top plate, and a spring secured to the base-plate and acting on the toe of the top plate in the manner of a jack-knife spring.

Figure 1:
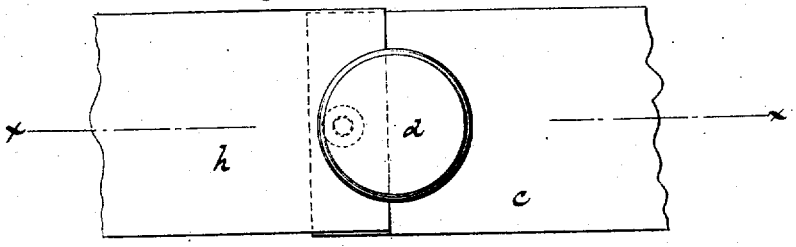
Figure 2:
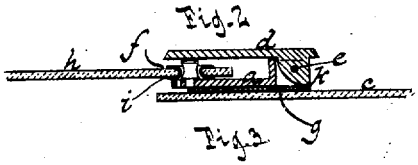
Figure 3:
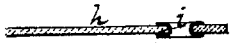
Figure 4:
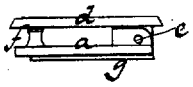
Figure 5:
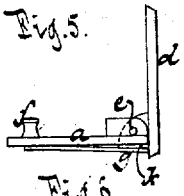
Figure 6:
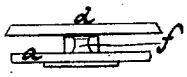
Figure 7:
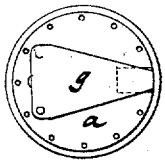

This invention is illustrated in the accompanying drawings, in which Figure 1 represents a top view of my clasp as applied to a garment or other article. Fig. 2 is a vertical section of the same in the plane *x x*, Fig. 1. Fig. 3 is a section of the upper lap of the article to which the clasp is to be applied. Fig. 4 is a side view of the clasp (detached) when closed. Fig. 5 is a similar view of the same when open. Fig. 6 is an end view of the same when closed. Fig. 7 is an inverted plan.

Similar letters indicate corresponding parts.

In these drawings, the letter *a* designates the base-plate of my clasp, which is made of metal, and circular, or in any other desirable form or shape. It is provided with a number of small holes, for the purpose of attaching it to the lower lap or body, *c*, of the article on which the clasp is to be used. To this base-plate is attached the top plate, *d*, by means of a hinge-joint, *e*, and from said base-plate rises a stud, *f*, which is intended to engage with a hole, *i*, in the outer lap, *h*, of the article to which my clasp is attached. (See Fig. 2.)

To the bottom surface of the base-plate *a* is firmly secured a spring, *g*, (best seen in Figs. 5 and 7,) which bears on a toe, *k*, that projects from the top plate, *d*, in such a position in relation to the pintle of the hinge-joint *e* that it has a tendency to retain the top plate in its closed position as well as in its open position, and that by the action of said spring the top plate, when closed, is depressed with a certain force upon the stud *f*.

The edges of the hole *i* in the outer lap, *h*, may be protected by an eyelet, as shown in Fig. 2, or by any other suitable means.

In the use of the above-described clasp the hole *i* in the outer lap, *h*, is pressed down over the stud *f*, and then the top plate, *d*, is closed down upon it, as shown in Fig. 2; and in order to hold the outer lap still more securely in place the sides of the stud *f* are made slightly concave.

To unfasten the outer lap, *h*, it is only necessary to take hold of the same and give it a quick pull in an outward direction, which will at once raise the top plate, *d*, and release said outer lap from the stud *f*.

What I claim as new, and desire to secure by Letters Patent, is—

The combination, substantially as hereinbefore described, of the base-plate, the stud secured in said base-plate, the top plate connected to the base-plate by a hinge-joint, the toe projecting from the top plate, and the spring secured to the base-plate and acting on the toe of the top plate.

In testimony whereof I have hereunto set my hand and affixed my seal this 15th day of April, 1881.

CHANDLER SEAVER, JR. [L. S.]

Witnesses:

J. HERMANN WAHLERS,

E. F. KASTENHUBER.